United States Patent [19]

Buehrig

[11] 4,441,752
[45] Apr. 10, 1984

[54] AUTOMOBILE REAR END CONSTRUCTION

[75] Inventor: Gordon M. Buehrig, Grosse Pointe Woods, Mich.

[73] Assignee: Richard P. Kughn, Detroit, Mich.

[21] Appl. No.: 342,180

[22] Filed: Jan. 25, 1982

[51] Int. Cl.³ .............................................. B62D 37/02
[52] U.S. Cl. ...................................... 296/1 S; 296/91
[58] Field of Search ........................... 296/1 S, 91, 195

[56] References Cited

U.S. PATENT DOCUMENTS

| | | | |
|---|---|---|---|
| 3,072,431 | 1/1963 | Shumaker | 296/1 S |
| 3,635,517 | 1/1972 | Wilfert et al. | 296/1 S |
| 3,799,603 | 3/1974 | Bott | 296/91 |
| 3,836,191 | 9/1974 | Götz | 296/1 S |
| 3,999,797 | 12/1976 | Kirsch et al. | |
| 4,174,863 | 11/1979 | Götz | 296/1 S |

Primary Examiner—Robert R. Song
Attorney, Agent, or Firm—Harness, Dickey & Pierce

[57] ABSTRACT

An automobile body of the type having a flat vertical rear end flared at the top and sides thereof and provided with elongate, angularly, rearwardly and inwardly extending air slots having inlet ends opening through the top and side body panels in front of the flared surfaces and outlet ends opening through said rear end through which air flows to reduce air turbulence behind the vehicle and drag caused by the turbulence and provided further with tail and signal lights in said slots.

5 Claims, 2 Drawing Figures

4,441,752

AUTOMOBILE REAR END CONSTRUCTION

BACKGROUND OF THE INVENTION

A characteristic of automotive vehicles particularly of the station wagon type is that, in use, air turbulence causes a low pressure air pocket to form behind the vehicle body that drags against forward motion of the vehicle and adversely affects fuel economy. Also, the low pressure air pocket causes road splash and dust to swirl in behind the vehicle and coat the rear end including the rear window and the tail and signal lights. This layer of road splash, dust and grime frequently accumulates in sufficient amount to impair visibility of the lights and to obstruct the view through the rear window which creates a driving hazard.

SUMMARY OF THE INVENTION

According to the present invention the top and sides of the vehicle body are formed with slight flares at the rearward ends thereof and inwardly and rearwardly extending through slots are provided inwardly of the flared ends. In use, air flowing through these slots is dumped into the low pressure air pocket behind the body with the result that air turbulence is reduced and drag otherwise induced by the low pressure pocket is minimized. As a consequence also, the tendency of road splash and dust to accumulate on the rear end of the vehicle body also is minimized and fuel efficiency is correspondingly increased.

DESCRIPTION OF THE PREFERRED EMBODIMENT

Figure 1:
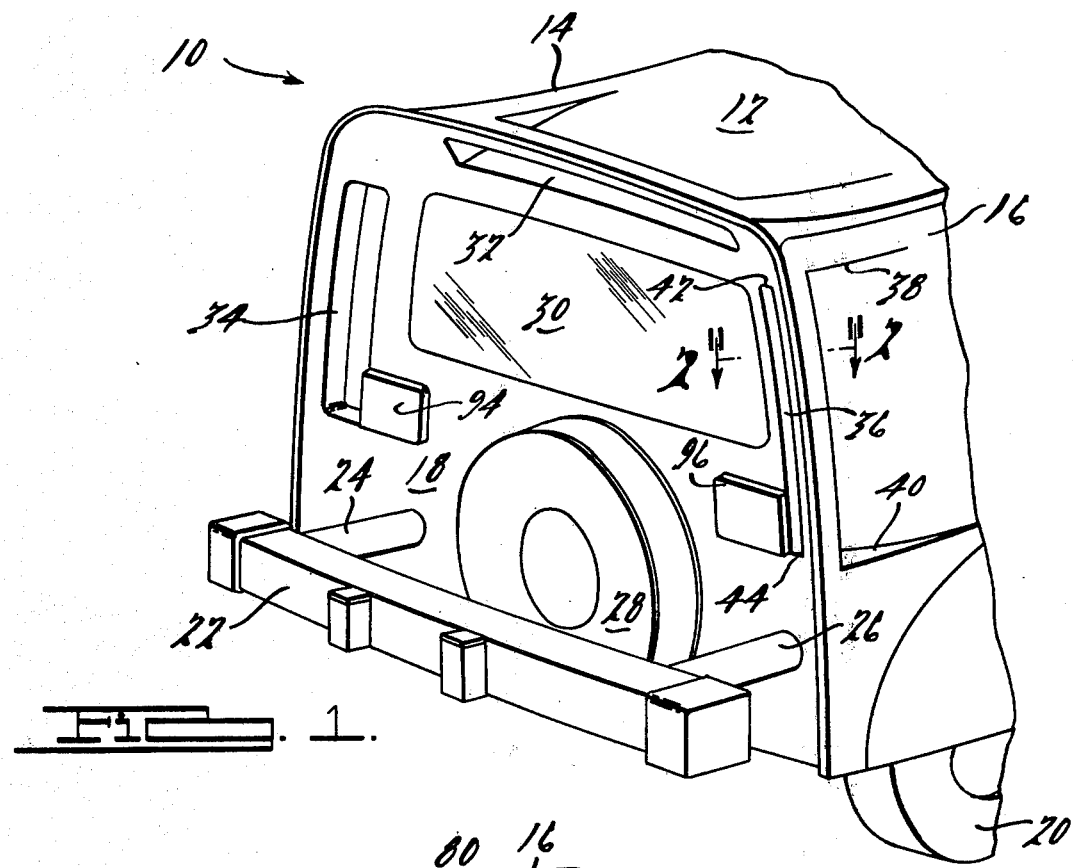
FIG. 1 is a fragmentary perspective view showing a vehicle rear end of the type described above embodying the present invention.

In the drawing, wherein for the purpose of illustration is shown a preferred embodiment of the invention, the numeral 10 designates the rear end of a station wagon-type automotive vehicle having a top 12, right and left sides 14 and 16, and a generally flat, essentially vertical rear end 18. The front portion of the vehicle (not shown) is conventional and it of course has the usual road wheels only one of which is shown at 20. A horizontal rear bumper 22 is attached to the vehicle frame (not shown) by suitable supports 24 and 26. The bumper 22 is positioned low at the rear of the vehicle body according to conventional practice and, in the particular vehicle here shown by way of illustration, the bumper supports 24 and 26 straddle a vertically mounted spare tire 28 on the rear 18 of the body behind the bumper and below the rear window 30 where it provides additional protection in a rear end crash.

According to the present invention, the vehicle top 12 is flared slightly upwardly at the rearward edge thereof and the two sides 14 and 16 are correspondingly flared laterally outwardly, as shown in FIG. 1. A horizontally elongate upper air slot 32 extends from the top 12 through the rear 18 and vertically elongate air slots 34 and 36 extend from the sides 14 and 16, respectively, through the rear 18. All three air slots 32, 34 and 36 have inlet ends opening through their respective top and sides 12, 14 and 16 immediately forwardly of the flared rear marginal edge portions of the latter and outlet ends in the rear 18 adjacent to the peripheral edges thereof.

As clearly shown in FIG. 1, the top and sides 12, 14 and 16 curve gradually inwardly to form the inner sides of the air slots 32, 34 and 36. This smooth inward curvature leading to the air slots 32, 34 and 36 induces air flowing rearwardly along the vehicle body when the latter is moving in a forward direction to enter and pass through the slots 32, 34 and 36 and flow of air into the slots is further induced by the flared top and side surfaces laterally outwardly of the slot inlets. In effect, this rearward flow of air is guided and directed into the air slots 32, 34 and 36 by the gradual inward curvature of the top and side panels leading into the slots, and this tendency of the airstream to enter and traverse the slots is further enhanced by air impinging against the flared surfaces disposed laterally outwardly of the slot inlets. All three airstreams discharging from the top and side air slots 32, 34 and 36 converge behind the vehicle body and collectively reduce the low pressure air pocket that otherwise is formed behind the vehicle as a result of air turbulence that results when the air moves past the rear end 18. As the three airstreams dump into the low pressure air pocket behind the vehicle, they reduce and minimize the differential in air pressure behind and alongside the vehicle body and mitigate drag otherwise caused by the air pocket to forward motion of the vehicle and correspondingly increase fuel efficiency. As indicated previously, the slots 32, 34 and 36 angle rearwardly and inwardly and the particular angle of the slots with respect to the longitudinal center line of the vehicle body preferably is within the range of 30° to 45°, but the angular disposition of the slots may vary within this range or even outside of it depending on the size and construction of the vehicle body and the physical dimensions and characteristics of the air slots themselves.

Manifestly, the particular construction of the vehicle body to form the air slots 32, 34 and 36 may vary considerably, and the construction in any particular instance may well be dictated and determined by the size, shape and construction of the body itself. However, a suitable and preferred slot construction is shown by the drawings. In this connection, attention is now directed to FIG. 2 which shows the slot 36 at the right side of the vehicle body and it will be understood that the upper slot 32 and the other side slot 34 are or may be similarly formed.

More particularly with reference to the air slot 36, the side skin panel 16 is slit vertically at the inlet end of the slot and horizontally as at 38 and 40 at the upper and lower ends of the vertical slit, and the rear skin panel 18 is similarly slit vertically and horizontally as at 42 and 44 at the outlet end of the slot, but the horizontal slits 42 and 44 in the rear skin panel 18 are considerably shorter than those in the side panel 16 because of the differences in shape of the slot inlet and the slot outlet.

Figure 2:
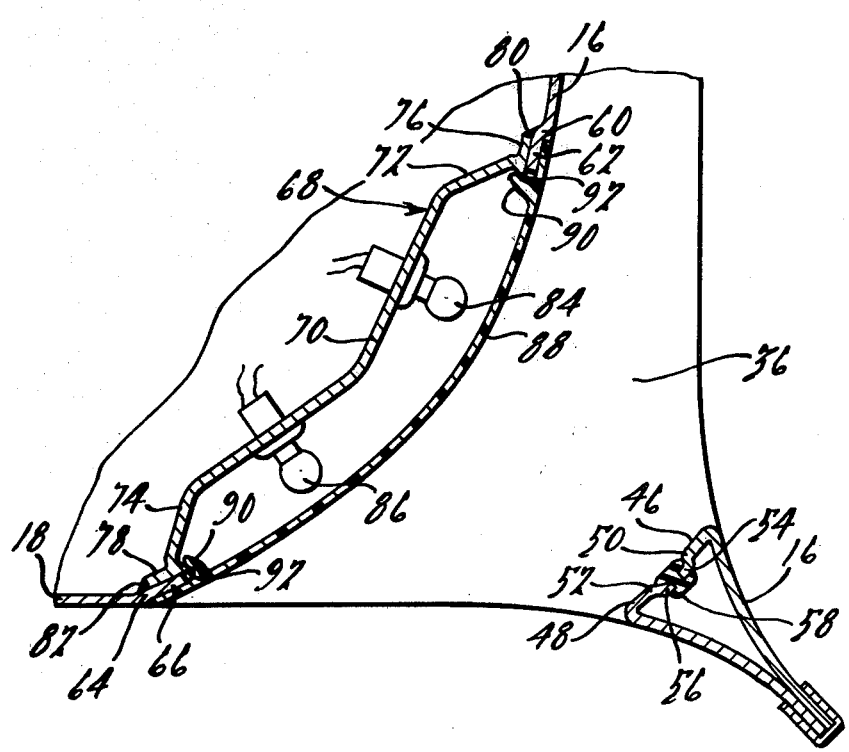
FIG. 2 is a fragmentary, horizontal sectional view taken on the line 2—2 of FIG. 1.

The relatively narrow portion 46 of the side panel 16 behind the vertical slit (or to the left of it as viewed in the drawing) and the relatively narrow portion 48 of the rear panel 18 outwardly (or to the right) of the vertical slit are bent inwardly toward each other, as shown in FIG. 2, and the marginal edges of these two portions are inwardly offset, as at 50 and 52, to define aligned, spaced-apart flanges 54 and 56 which are joined by an intermediate sealing strip 58 made of a suitable elastomeric material and generaly I-shaped in cross-section.

The middle web portion of the sealing strip 58 is disposed between the spaced confronting edges of the flanges 54 and 56 and the head portions of the sealing strip overlap both in front of and behind the offset flanges 54 and 56. Ideally, the head portion of the sealing strip 58 facing the slot 36 is of a thickness substantially equal to the offsets 50 and 52 so that the exposed surface of the head portion extends generally flush with the adjacent outer surfaces of the flanges 46 and 48. Thus, the flanges 46 and 48 and the sealing strip 58 collectively present an essentially smooth, uninterrupted surface at the outer side of the slot 36 and they preferably are formed to be slightly concave in transverse section and generally parallel to the inner wall of the slot 36 so as not to interrupt or create turbulence in the airstream traversing the slot.

The portion of the side panel 16 disposed forwardly or to the right of the vertical slit is rolled inwardly in a long sweeping curve and the vertical marginal edge portion thereof is inwardly offset, as at 60, to define the flange 62. On the other hand, the portion of the rear panel 18 inwardly or to the left of its vertical slit is rolled abruptly forwardly and formed with an offset 64 to define the flange 66. A light panel 68 having a back portion 70 and side wall portions 72 and 74 formed with laterally, outwardly extending flanges 76 and 78 is disposed inwardly of the side and rear panels 16 and 18 with the flanges 76 and 78 behind and in engagement with the side and rear wall flanges 62 and 66 and rigidly connected thereto in any suitable or conventional manner, as by tack welds 80 and 82. The light panel 68 preferably extends the full depth of the slot 36 so as to entirely close the space between the side and rear panel flanges 62 and 66. Mounted on the light panel 68 adjacent to the side wall 72 is a vertical series of lights, one of which is shown at 84 in FIG. 2, that are suitably connected into the electrical signal and/or braking systems of the vehicle so as to be illuminated when the headlights are on and/or when the brakes are applied. Similarly, a vertical series of lights 86 are mounted on the light panel 68 adjacent to the side flange 74 and the lights 86 are connected into the electrical system of the vehicle in the same manner as the lights 84. This arrangement positions the column of lights 84 so that they are clearly visible from the side of the vehicle through the inlet end of the slot 36, and both columns of lights 84 and 86 so that they are readily visible from the rear of the vehicle through the outlet end of the slot 36.

Mounted in front of the light panel 68 is a lens 88 that preferably is made of a transparent or translucent and suitably colored plastic material that permits clear visibility of the columns of lights 84 and 86. The panel 68 and the lens 88 both extend the full depth of the slot 36 so that the lens is part of the inner wall of the slot 36. Both the forward and the rearward marginal edge portions of the lens 88 seat on the inwardly offset flanges 62 and 66 of the side and rear panels 16 and 18. Any suitable or conventional means may be provided for fastening the lens 88 in place but, in the particular construction here shown, the lens is formed at the inner side thereof with snap fasteners 90 that engage behind ribs 92 provided on the light panel 68 at the outer edges of the side walls 72 and 74 generally in alignment with the flanges 76 and 78. Manifestly, the snap fasteners 90 should hold the lens 88 securely attached to the light panel 68 under all normal operating conditions. However, the snap fasteners 90 should also disengage the interlocking ribs 92 when a prying force is applied to the seated marginal edge portions of the lens so that the latter is readily removable for service of the sockets in which the bulbs 84 and 86 are mounted and of the wiring connections to the sockets or to permit replacement of the bulbs.

It is desirable, of course, that the lens 88, when engaged with the light panel 68 in the manner described, extend flush with the adjacent portions of the side and rear body panels 16 and 18 so as not to cause undesirable turbulence of the airstream traversing the slot 36. To this end, the thickness of the lens 88 is substantially equal to the offset dimension of the seating flanges 62 and 66. Also, the lens 88 preferably is convexly curved transversely so as to conform to the desired inner wall contour of the slot 36, as shown in FIG. 2. In every instance, the light panel 68 is sufficiently wide to assure clear visibility of the lights 84 and 86, and the side and rear body panels 16 and 18 are trimmed at the slot 36 as required to accommodate the width of light panel necessary to assure good visibility of the lights through the inlet and outlet ends of the slot. Suitable filler pieces (not shown) are fitted into the air slot 36 to close the same at the top and bottom thereof and these pieces are suitably formed to blend the top and bottom closure pieces smoothly with the inner and outer walls of the slot so as to fully enclose and confine the airstream traversing the latter.

While a detailed description of the air slot 36 only is here given, it will be readily understood that the air slot 32 at the top of the vehicle body and the air slot 34 at the opposite side of the body is similarly formed and constructed. Accordingly, a detailed description of these other air slots is unnecessary. It should perhaps be noted, however, that while the upper air slot 32 may be formed in the same manner as the air slot 36, it may or may not be necessary or desirable to include the light panel and covering lens arrangement provided for the air slots at the sides of the vehicle. In the event lights are not provided in the upper slot 32, the top and rear skin panels 12 and 18 are merely butted and suitably fastened together at the inner side of the slot or alternatively, a filler piece is inserted between and fastened to the panels in any suitable or conventional manner.

In addition, it is contemplated that suitable reflectors, such as those shown at 94 and 96, may be provided at the inner sides of and adjacent to the air slots 34 and 36 or at such other location on the vehicle as may be deemed necessary or desirable.

From the foregoing, it will be readily apparent that airstreams traversing the slots 32, 34 and 36 when the vehicle is in forward motion flow into the low pressure air pocket normally formed behind the vehicle of the type involved here to reduce air turbulence behind the vehicle and to minimize the resultant drag on the vehicle that otherwise adversely affects its fuel efficiency. Also, by dumping air into the low pressure air pocket and inhibiting air turbulence behind the vehicle, the airstreams reduce accumulation of road splash, dirt and grime on the rear of the vehicle body and thus prevent to some extent reduced visibility of the tail and signal lights. Additionally, by mounting the tail and signalling lights in the air slots, the fast moving airstreams traversing the slots help maintain the light covers or lenses free of dust and grime and assure better visibility of the lights at all times. Placement of the lights 84 and 86 in the air slots also locates and disposes the lights relatively high on the vehicle body more nearly in line-of-sight of the drivers of following vehicles and thus makes them more readily visible to other drivers. Also, the location of the rear lights high on the vehicle body at both sides and also perhaps at the top thereof gives the vehicle a unique and distinctive appearance. Manifestly, tail and signalling lights mounted in the air slots are better protected against breakage than are lights mounted in exposed locations on the rear of the vehicle body in the conventional way. Also, air flow through the slots helps prevent snow and ice from accumulating on the lights.

While it will be apparent that the invention herein described is well calculated to achieve the benefits and advantages as hereinabove set forth, it will be appreciated that the invention is susceptible to modification, variation and change without departing from the spirit thereof.

Having thus described the invention, I claim:

1. An automotive vehicle body having top and right and left side panels the rearward edges of which intersect with a substantially flat, generally vertical rear end, said body being provided adjacent the rear end thereof with a plurality of slot means through which air moving rearwardly along said body flows when the vehicle is traveling in a forward direction, said slot means being disposed inwardly of and elongate in directions substantially parallel to at least certain of said intersecting edges, each of said slot means having inner and outer walls defining a passageway extending angularly rearwardly and inwardly between an inlet end in one of said panels and an outlet end in said rear end, the inner walls of said slot means merging at the inlet ends thereof smoothly and relatively gradually with their respective panels to enhance air flow into said slots and merging at the outlet ends thereof relatively abruptly with said rear end, whereby airstreams flowing through said slot means converge in a low pressure air pocket normally created behind said vehicle body in use so as to minimize drag effect on the forward motion of said vehicle caused by said air pocket and the attendant air turbulence behind said body, the inner walls of at least certain of said slot means being formed with openings therein, and including light support means secured to said inner walls at said openings, and light means disposed on said support means so as to be visible through both the inlet and outlet ends of said certain slot means.

2. An automotive vehicle body having top and right and left side panels the rearward edges of which intersect with a substantially flat, generally vertical rear end, said body being provided adjacent the rear end thereof with a plurality of slot means through which air moving rearwardly along said body flows when the vehicle is traveling in a forward direction, said slot means being disposed inwardly of and elongate in directions substantially parallel to at least certain of said intersecting edges, each of said slot means having inner and outer walls defining a passageway extending angularly rearwardly and inwardly between an inlet end in one of said panels and an outlet end in said rear end, the inner walls of said slot means merging at the inlet ends thereof smoothly and relatively gradually with their respective panels to enhance air flow into said slots and merging at the outlet ends thereof relatively abruptly with said rear end, whereby airstreams flowing through said slot means converge in a low pressure air pocket normally created behind said vehicle body in use so as to minimize drag effect on the forward motion of said vehicle caused by said air pocket and the attendant air turbulence behind said body, the inner walls of at least certain of said slot means being formed with openings therein, and including light support means secured to the inner walls of said certain slot means and extending across the openings in said inner walls, said light support means having first portions thereof at least generally facing the inlet ends of said certain slot means and second portions thereof at least generally facing the outlet ends of said certain slot means, and light means mounted on both said first portions and said second portions of said light support means directly visible from both the side and from the rear of said vehicle through the inlet and outlet ends of said certain slot means.

3. An automotive vehicle body according to claim 2 including lens means carried by said light support means disposed in front of said light means and closing the openings in which said light means are mounted.

4. An automotive vehicle body according to claim 3 wherein said lens means have snap-in interlocking engagement with said light support means.

5. An automotive vehicle body according to claim 4 wherein the marginal edge portions of said inner walls adjacent to said openings are offset away from said slot means, and wherein said lens means are supported on said marginal edge portions with the outer surfaces thereof substantially flush with said inner walls.

* * * * *